US011525479B2

(12) United States Patent
Tanaka

(10) Patent No.: US 11,525,479 B2
(45) Date of Patent: Dec. 13, 2022

(54) ANTI-ELECTROLYTIC CORROSION ROLLING BEARING

(71) Applicant: NTN Corporation, Osaka (JP)

(72) Inventor: Yutaka Tanaka, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/276,705

(22) PCT Filed: Sep. 24, 2019

(86) PCT No.: PCT/JP2019/037271
§ 371 (c)(1),
(2) Date: Mar. 16, 2021

(87) PCT Pub. No.: WO2020/067012
PCT Pub. Date: Apr. 2, 2020

(65) Prior Publication Data
US 2022/0003273 A1 Jan. 6, 2022

(30) Foreign Application Priority Data

Sep. 27, 2018 (JP) ............................. JP2018-182080
Feb. 26, 2019 (JP) ............................. JP2019-032745

(51) Int. Cl.
F16C 19/06 (2006.01)
F16C 33/62 (2006.01)
(Continued)

(52) U.S. Cl.
CPC ............... F16C 33/62 (2013.01); C23C 4/10 (2013.01); C23C 4/11 (2016.01); F16C 19/06 (2013.01);
(Continued)

(58) Field of Classification Search
CPC ........ F16C 19/06; F16C 33/586; F16C 33/62; F16C 33/64; F16C 2202/10;
(Continued)

(56) References Cited

U.S. PATENT DOCUMENTS

2009/0304318 A1 12/2009 Konno et al.
2017/0356075 A1 12/2017 Takeuchi et al.
2018/0274594 A1 9/2018 Preis et al.

FOREIGN PATENT DOCUMENTS

DE 202017101725 5/2017
JP 2007-198519 8/2007
(Continued)

OTHER PUBLICATIONS

English Translation of International Preliminary Report on Patentability dated Mar. 23, 2021 in corresponding International (PCT) Patent Application No. PCT/JP2019/037271.
(Continued)

Primary Examiner — Phillip A Johnson
(74) Attorney, Agent, or Firm — Wenderoth, Lind & Ponack, L.L.P.

(57) ABSTRACT

An anti-electrolytic corrosion rolling bearing includes an inner ring and an outer ring, rolling elements, and a thermal-sprayed ceramic film having electrical insulating properties, and disposed on one or each of the inner peripheral surface of the inner ring and the outer peripheral surface of the outer ring. The thermal-spray material forming the thermal-sprayed ceramic film contains, as the main component thereof, alumina particles having particle sizes of 5 μm to 60 μm and an average particle size of 30 μm to 60 μm. The thermal-sprayed ceramic film is densified by filling the pores between the alumina particles, with a predetermined amount of glassy melts of a metal oxide having a melting point lower than that of the alumina, such as silica, yttria, titania or
(Continued)

zirconia, and having an average particle size of 5 μm to 40 μm.

16 Claims, 5 Drawing Sheets

(51) Int. Cl.
*F16C 33/64* (2006.01)
*F16C 33/58* (2006.01)
*C23C 4/10* (2016.01)
*C23C 4/11* (2016.01)

(52) U.S. Cl.
CPC ............ *F16C 33/586* (2013.01); *F16C 33/64* (2013.01); *F16C 2206/44* (2013.01); *F16C 2206/48* (2013.01); *F16C 2223/42* (2013.01); *F16C 2380/26* (2013.01)

(58) Field of Classification Search
CPC .............. F16C 2206/44; F16C 2206/48; F16C 2223/42; F16C 2380/26; C23C 4/10; C23C 4/11
See application file for complete search history.

(56) References Cited

FOREIGN PATENT DOCUMENTS

| | | |
|---|---|---|
| JP | 2008-050669 | 3/2008 |
| JP | 2008-169959 | 7/2008 |
| JP | 5025190 | 9/2012 |
| JP | 2015-212576 | 11/2015 |
| JP | 2015-230058 | 12/2015 |
| JP | 2016-014413 | 1/2016 |
| JP | 2017-053481 | 3/2017 |
| WO | 2014/156205 | 10/2014 |
| WO | WO-2014156205 A1 * 10/2014 | ............... C23C 4/11 |
| WO | WO-2014156206 A1 * 10/2014 | ............... C23C 4/11 |

OTHER PUBLICATIONS

International Search Report dated Oct. 29, 2019 in corresponding International (PCT) Patent Application No. PCT/JP2019/037271.
Extended European Search Report dated Oct. 5, 2021 in European Patent Application No. 19864957.6.

* cited by examiner

Amount of added SiO$_2$ (thermal-spray distance 150mm)

Addition of 1.5% by mass of $SiO_2$

Addition of no $SiO_2$

ANTI-ELECTROLYTIC CORROSION ROLLING BEARING

TECHNICAL FIELD

The present invention relates to an anti-electrolytic corrosion rolling bearing which supports, while insulating, a rotary shaft through which an electric current may flow, such as a rotary shaft of an electric motor or a power generator, thereby preventing electrolytic corrosion of the rotary shaft at its portions through which an electric current passes.

BACKGROUND ART

Generally, an anti-electrolytic corrosion rolling bearing which supports a rotary shaft of, e.g., an electric motor or a power generator has corrosion resistance and electrical insulating properties due to thermal-sprayed films formed by thermal-spraying particles or powder made of a hard material such as a ceramic material onto surfaces of predetermined bearing components made of a metal such as steel.

However, a thermal-sprayed film made of a ceramic material has pores such as spaces, gaps or voids defined during the film formation process, and part of these pores communicate with each other. Thus, gas or liquid in contact with the outer side of the thermal-sprayed film may infiltrate into the thermal-sprayed film via such communicating gaps, thereby deteriorating the corrosion resistance and electrical insulating properties of the thermal-sprayed film.

In order to improve the insulating properties of a bearing formed with such a thermal-sprayed film, it is effective to increase the density of the thermal-sprayed film such that gas and liquid would not infiltrate into the film.

When alumina is used for such thermal spraying, atmospheric pressure plasma thermal spraying, which is performed in the normal atmosphere, is often used. In that case, in order to densely form the thermal-sprayed film, the powdered thermal-spray material is preferably formed into a film in a substantially molten state, by positioning the workpiece and the thermal-spray discharge port at as short distance as possible from each other.

However, in the thermal-spraying step in which the workpiece is a bearing, if the workpiece and the thermal-spray discharge port are positioned too close to each other, the workpiece, which has already been quenched and tempered, rises in temperature, and thus may be tempered again. It is difficult to adjust the distance between the workpiece and the thermal-spray discharge port such that they are sufficiently close to each other but not so close as to cause tempering.

When a powdered thermal-spray material is melted and formed into a film, in the step of dissipating, at room temperature, heat from the high-temperature thermal-sprayed film, microcracks tend to be formed in the film, and such microcracks tend to decrease the breakdown voltage.

Therefore, in a conventional alumina thermal-spraying step, attempts have been made to form a dense thermal-spray material having as low a breakdown voltage as possible, by decreasing the thermal-spray distance to such an extent that the workpiece is not tempered, and/or by adjusting the particle sizes of the powdered thermal-spray material.

For example, Japanese Patent. No. 5025190 discloses an insulating, anti-electrolytic corrosion rolling bearing in which a thermal-sprayed layer having a porosity of 2 to 6% is formed by thermal spraying a thermal-spray material containing 97% by mass of alumina having particle sizes of 10 to 50 μm and an average particle size of 15 to 25 μm, with 1% or less by mass of a metal oxide such as titania, silica, or chromium oxide added, and its pores are sealed with a resin so as to reduce variations in insulation resistance. Japanese Pat. No. also discloses that, if a metal oxide, which tends to have hydrophilicity, is added too much, this reduces the breakdown voltage.

Also, it is known that, in an anti-electrolytic corrosion rolling bearing including, on required portions of its inner and outer rings, insulating layers comprising thermal-sprayed films of fused alumina ($Al_2O_3$), by adding 10 to 40% by mass of silicon dioxide ($SiO_2$), it is possible to reduce the numbers of pores defined in the insulating layers, and thus to improve the insulating properties of the layers (e.g., paragraph [0014] of Japanese Unexamined Patent Application Publication No. 2016-14413).

Also, an insulating rolling bearing is known which includes a thermal-sprayed ceramic layer containing 97% or more by mass of alumina having particle sizes of 10 to 50 μm and an average particle size of 15 to 25 μm, and further containing 0.5 to 2.5% or more by mass of zirconia so that the thermal-sprayed layer has both the required insulating properties and an evenly colored appearance (Japanese Unexamined PATENT Application Punlication No. 2007-198519).

However, in a conventional alumina thermal-spraying step, in order to effectively form a dense thermal-sprayed film, it is necessary to adjust and reduce the thermal-spray distance to the limit beyond which the workpiece is adversely affected due to heating during thermal spraying. Also, it is necessary to ensure cooling time by frequently interrupting or weakening thermal spraying. Therefore, it takes a considerably long time to form a dense film by thermal spraying, and the manufacturing efficiency deteriorates, and the manufacturing cost increases.

In order to perform thermal spraying under the optimum conditions by adjusting, e.g., the powder particles sizes, and reducing the thermal-spray distance to the limit beyond which tempering occurs due to thermal spraying, it is necessary to avoid the risk of tempering or microcracks by performing experiments repeatedly. Still, tempering or microcracks may occur due to a slight difference in thermal-spraying conditions.

In an anti-electrolytic corrosion rolling bearing used, e.g., in an electric motor, a return electric current or a motor shaft electric current may flow. If a high voltage current exceeding the breakdown voltage flows, the insulating layer of the bearing will be destroyed, so that the bearing will irreversibly lose its anti-electrolytic corrosion properties. Therefore, in view of safety, too, such a rolling bearing needs to have a sufficiently high breakdown voltage.

As disclosed in Japanese Patent No. 5025190, if the average particle size of alumina as the main component of the thermal-sprayed film at the time of thermal spraying is set at 15 to 25 μm, though the porosity of the thermal-sprayed film decreases to some extent, it is difficult to close the pores within the thermal-sprayed film.

Also, since a metal oxide such as titania, silica, or chromium oxide as disclosed in Japanese Patent No. 5025190 has a high hydrophilicity, and thus tends to cause variations in insulation resistance, i.e., destabilize the insulation resistance, the amount thereof is limited to 1% or less by mass, preferably 0.5% or less by mass, more preferably 0.2% or less by mass. However, it is impossible to stably obtain excellent insulating properties, i.e., a breakdown voltage of 6 kV or more.

The ceramic, thermal-sprayed layer disclosed in Japanese Unexamined Patent Application Publication No. 2007-198519 contains alumina having particle sizes of 10 to 50

μm and an average particle size of 15 to 25 μm for more efficient adhesion, and further contains 0.5 to 2.5% or more by mass of zirconia. However, it is difficult to fill the pores between the alumina particles having small particle sizes, with zirconia of which the particle sizes are indefinite. Therefore, in this case, too, it is difficult to obtain a breakdown voltage of 6 kV or higher.

Also, as disclosed in Japanese Unexamined Patent Application Publication No. 2016-14413, even if 10 to 40% by mass of silicon dioxide is added to alumina as fused alumina, it is difficult to stably obtain excellent insulating properties, i.e., a breakdown voltage of 6 kV or more (FIG. 2 and paragraph [0024] of Japanese Unexamined Patent Application Publication No. 2016-14413).

The reason therefore is probably because, by filling the pores with a large amount of silica, microcracks tend to be formed due to the difference in thermal expansion between the alumina and the glass phase, and gas and liquid infiltrates, via these microcracks, into the thermal-sprayed film from the outside thereof.

An object of the present invention is to solve the above problems, i.e., to provide an anti-electrolytic corrosion rolling bearing which includes a thermal-sprayed film densified in its entirety including its interior so as to be uniform in quality, and which has, after the pores of the film are sealed, excellent insulating properties to obtain a breakdown voltage of 6 kV or more.

It is another object of the present invention to provide an anti-electrolytic corrosion rolling bearing of which the base material is not tempered due to heating, and which includes a thermal-sprayed film having an excellent formability to be formable at a predetermined thermal-spray distance or more, and further densified to have excellent insulating properties.

In order to achieve the above objects, the present invention provides an anti-electrolytic corrosion rolling bearing comprising: an inner ring and an outer ring; a plurality of rolling elements rotatably disposed between a raceway surface of the inner ring and a raceway surface of the outer ring; and a thermal-sprayed ceramic film having electrical insulating properties, and disposed on one or each of an inner peripheral surface of the inner ring and an outer peripheral surface of the outer ring, wherein a thermal-spray material forming the thermal-sprayed ceramic film comprises, as a main component thereof, alumina particles having particle sizes of 5 to 60 μm and an average particle size of 30 to 60 μm, and wherein the thermal-sprayed ceramic film is densified by filling pores between the alumina particles, with glassy melts of at least one metal oxide, the glassy melts having an average particle size of 5 to 40 μm.

The inventor of the present application discovered that, in the ceramic, thermal-sprayed film of the above anti-electrolytic corrosion rolling bearing of the present invention, by using, as the main component of the thermal-spray material, alumina particles having particle sizes of 5 to 60 μm and an average particle size of 30 to 60 μm, and by filling, e.g., the underlying pores which are not open to the film surface, with glassy melts of a metal oxide having an average particle size of 5 to 40 μm, the thermal-sprayed ceramic film is densified.

In addition to filling the pores underlying in the thermal-sprayed ceramic film, it is preferable to seal, by ordinary pore sealing treatment, the pores open to the film surface so as to prevent the infiltration of a liquid from the film surface. Such a thermal-sprayed ceramic film is densified from its interior to its surface, and thus has high insulating properties with the pores underlying from the film interior toward the film surface filled with a glassy metal oxide, and with the pores open to the film surface sealed with a sealing agent.

Since the anti-electrolytic corrosion rolling bearing of the present invention includes a thermal-sprayed ceramic film densified to have high insulating properties, the rolling bearing has uniform excellent insulating properties to obtain a breakdown voltage of 6 kV or more.

In order to fully seal the pores of the film, the thermal-sprayed ceramic film preferably contains, based on 100% by mass of the thermal-sprayed ceramic film, more than 1.0% and 5.0% or less, e.g., 1.5 to 5.0% by mass of the glassy melts of the at least one metal oxide having an average particle size of 5 to 40 μm.

If a small amount of, specifically less than 1.5% by mass of, metal oxide lower in melting point than alumina having predetermined particle sizes is added to the alumina, part of the pores remain unsealed in the obtained thermal-sprayed film, thereby destabilizing the measurement result of breakdown voltage.

Also, if more than 5.0% by mass of a glassy metal oxide is added to alumina, the glassy metal oxide whose amount exceeds the amount required for insulation is scattered in the obtained thermal-sprayed film, and microcracks tend to be formed in the glassy portions due to the difference in thermal expansion between the alumina and the metal oxide. This destabilizes the measurement result of breakdown voltage, and the average value of breakdown voltage may not reach desired 6 kV.

Also, by adding a predetermined amount of metal oxide to alumina, the melting point of the alumina decreases, so that the alumina easily melts. Therefore, even if the thermal-spray material is thermal sprayed at a distance within which the base material of the bearing is not tempered, since the thermal-spray material has been fully molten at this time, it is possible to form a densified thermal-sprayed ceramic film with the material.

As a metal oxide or oxides suitable for use in the present invention, it is preferable to use one or more metal oxides which have high insulating properties, and a melting point lower than that of alumna forming the alumina particles, and which are selected from the group consisting of silica, yttria, titania and zirconia that easily vitrify during film formation.

Especially if the one or more metal oxides are silica, the silica is chemically combined with the alumina to become mullite, thereby densifying the thermal-sprayed ceramic film.

The thermal-sprayed ceramic film is preferably a film formable by thermal spraying at a thermal-spray distance of 140 to 170 mm, and densified such that a breakdown voltage thereof is 6 kV or more.

Since the above thermal-sprayed ceramic film is formable by thermal spraying at a predetermined thermal-spray distance or more within which the rolling bearing is not tempered due to heating, it is not necessary to ensure a lot of time for cooling during thermal spraying. Therefore, it is possible to form a densified film efficiently without interrupting thermal spraying, i.e., to efficiently perform the ceramics thermal-spraying step for film formation.

Since the above thus-formed thermal-sprayed ceramic film has a breakdown voltage of 6 kV or more, the anti-electrolytic corrosion rolling bearing has desired, stable and excellent insulating properties.

The anti-electrolytic corrosion rolling bearing of the present invention includes a thermal-sprayed film which is formed by thermal-spraying a thermal-spray material containing, as the main component thereof, alumina particles having predetermined particle sizes, and in which the pores between the alumina particles are filled with glassy melts of a metal oxide having a predetermined particle size. The thermal-sprayed film is densified in its entirety including it interior, and thus has uniform insulating properties to obtain a breakdown voltage of 6.0 kV or more after pore sealing treatment. Thus, the rolling bearing of the present invention has quite excellent insulting properties.

The thermal-sprayed ceramic film of the anti-electrolytic corrosion rolling bearing is a densified film efficiently formable by thermal spraying at a predetermined thermal-spray distance or more within which the rolling bearing is not tempered due to heating.

DETAILED DESCRIPTION OF THE INVENTION

Figure 1:
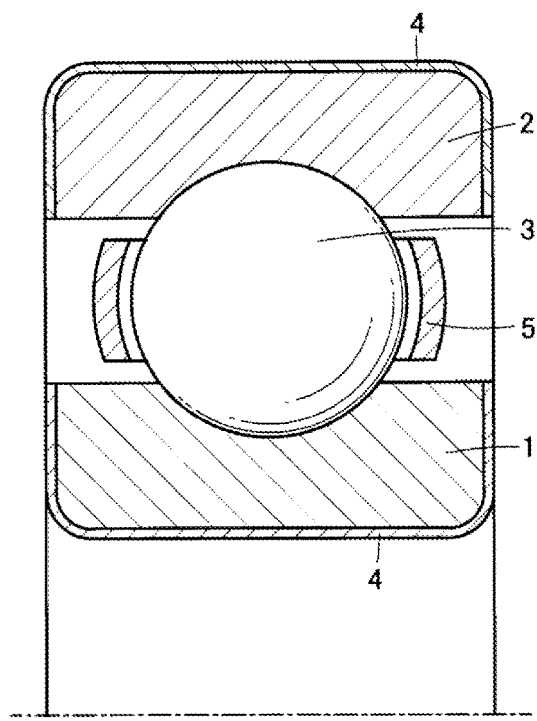
FIG. 1 is a sectional view of a portion of an anti-electrolytic corrosion rolling bearing embodying the present invention.

As illustrated in FIG. 1, the anti-electrolytic corrosion rolling bearing embodying the present invention includes an inner ring 1 and an outer ring 2; a plurality of rolling elements (balls) 3 rotatably disposed between the raceway surfaces of the inner and outer rings; and thermal-sprayed ceramic films 4 having electrical insulating properties, and disposed, respectively, on the inner peripheral surface of the inner ring 1 and the outer peripheral surface of the outer ring 2. Numeral 5 in FIG. 1 indicates a cage 5. One of the thermal-spray ceramic films 4 on the inner ring 1 and the outer ring 2 may be omitted.

The thermal-sprayed ceramic films 4 on the anti-electrolytic corrosion rolling bearing of the embodiment is formed by thermal-spraying a thermal-spray material containing, as the main component thereof, alumina particles having an average particle size of 40.0 µm or less. The thermal-sprayed ceramic films 4 are each densified by filling the pores between the above alumina particles, with glassy melts of a metal oxide or oxides having an average particle size of 5 to 40 µm, preferably less than 40 µm.

The alumina used may be one having particle sizes of 5 to 60 µm and an average particle size of 30 to 60 µm. If alumina is used which has particle sizes or an average particle size exceeding the above numerical ranges, the number and sizes of the pores between the alumina particles will increase to such an extent that it becomes impossible for the glassy metal oxide(s) to reliably fill the pores with no gaps, thereby making it difficult to form a sufficiently dense thermal-sprayed film. For efficient adhesion by thermal spraying, alumina is preferably used which has particle sizes of 5 µm or more and an average particle size of 30 µm or more.

The metal oxide(s) as the added component(s) has an average particle size of 5 to 40 µm, and a melting point lower than that of the alumina. If the metal oxide(s) has an average particle size of less than 5 µm, since such metal oxide(s) would be dispersed too finely, it is difficult for the metal oxide(s) to congregate to form glassy small lumps that sufficiently fill the pores/gaps around the alumina particles. If the metal oxide(s) has an average particle size of more than 40 µm, it is difficult for the metal oxide(s) to flow into small pores, so that it is difficult to sufficiently densify the thermal-sprayed ceramic film.

In order to form a ceramic, thermal-sprayed film stably showing a desired breakdown voltage, the metal oxide(s) is preferably selected from the group consisting of silica ($SiO_2$), yttria ($Y_2O_3$), titania ($TiO_2$) and zirconia ($ZrO_2$).

A metal oxide (or oxides) that easily vitrifies, such as silica, yttria, titania or zirconia, acts to fill the pores defined by the alumina by vitrifying during film formation.

By adding a predetermined amount of such metal oxide(s) to the alumina as the main component, it is possible to obtain a thermal-sprayed ceramic film which is dense from its interior to its surface. It is considered that an increase in the number of underlying pores due to insufficient densification would cause variations in breakdown voltage. However, in the present invention, since substantially all the pores disappear by being filled with the metal oxide(s), variations in insulating performance decrease.

The composition of the thermal-spray material may be, e.g., 95.0 to 98.5% by mass of alumina and 1.5 to 5.0% by mass of a metal oxide or oxides. For example, if the alumina content is 97.0% or more by mass, and the content of the metal oxide(s) such as zirconia is 1.5 to 2.5% by mass, it is possible to improve not only the insulating properties of the film but also the strength and toughness thereof. Another known metal oxide may also be added as necessary.

By adding more than 1.5% by mass of the metal oxide(s), a desired breakdown voltage is obtained. However, if more than 5.0% by mass of the metal oxide(s) is added, the breakdown voltage tends to decrease. This is presumably because, if the amount of added metal oxide(s) is too large, the glass phase filling the pores becomes too large after thermal spraying, so that microcracks tend to be formed due to, e.g., the difference in thermal expansion between the alumina and the metal oxide, thus lowering the breakdown voltage. The breakdown voltage mentioned in the present specification can be measured according to JIS K 6911.

As the thermal-spraying method, a known plasma thermal-spraying method such as an atmospheric pressure plasma thermal-spraying method may be used. Another known thermal-spraying method such as a powder flame thermal-spraying method or a high-speed gas flame thermal-spraying method may also be used.

The device for forming a thermal-sprayed ceramic film includes, as a thermal spraying means, a thermal-spray gun having a discharge port from which the thermal spray material is thermal-sprayed (discharged). For example, a known thermal-spraying robot system may be used. The "thermal-spray distance" used herein refers to the distance between the workpiece and the thermal-spray discharge port.

The thus-formed thermal-sprayed ceramic film preferably has a large thickness according to the required insulating properties, for example, a thickness of 250 μm or more.

EXAMPLES

Examples 1 to 6, Comparative Examples 1 to 4

After, as pretreatment, washing and degreasing the inner and outer rings of a deep groove ball bearing made of bearing steel, masking and blasting treatments were performed to the bearing surfaces other than the outer peripheral surface of the outer ring (including both end surfaces thereof), and the inner peripheral surface of the inner ring (including both end surfaces thereof). Then, by performing atmospheric plasma thermal spraying to these treated surfaces, thermal-sprayed films were formed thereon.

The thermal-spray material for use in each of Examples 1 to 6 and Comparative Examples 1 to 4 was prepared by mixing a moderate amount of gray alumina powder for coloring (particle size: 8 to 38 μm, average particle size: about 32 μm) with high-purity alumina powder ($Al_2O_3$) (particle size: 8 to 38 μm, average particle size: about 32 μm); and further adding thereto silica ($SiO_2$) which has an average particle size of 10.0 μm, and of which the amount is shown in Table 1.

In particular, by performing, using this thermal-spray material, commonly used atmospheric pressure plasma thermal spraying at a thermal-spray distance of 150 mm, thermal-sprayed alumina films (thermal-sprayed ceramic films) having a layer thickness of 560 μm were formed, respectively, on the above treated surfaces of the inner and outer rings, and pore sealing treatment was performed to the films with an epoxy resin-based sealing agent. Then, polishing treatment was performed. The thus-prepared inner and outer rings were assembled into the rolling bearing of each of Examples 1 to 6 and Comparative Examples 1 to 4.

Figure 2:
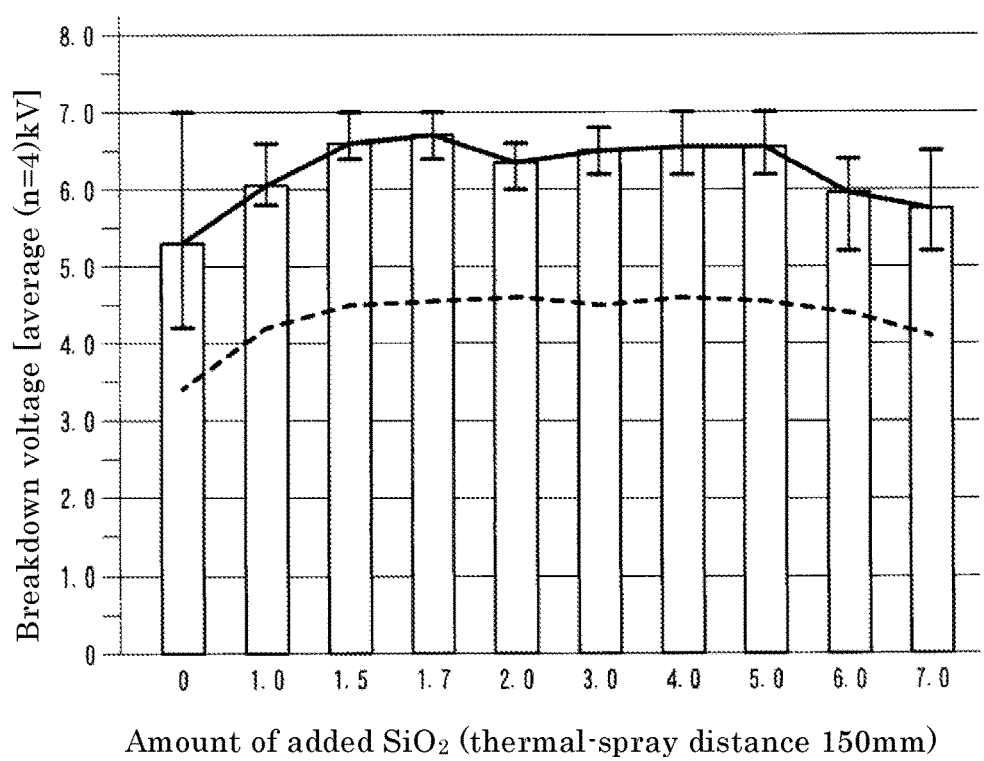
FIG. 2 is a graph showing the relationship between the amounts of added silica and breakdown voltages in Examples 1 to 6, Comparative Examples 1 to 4, and Reference Examples 1 to 9.
Figure 3:
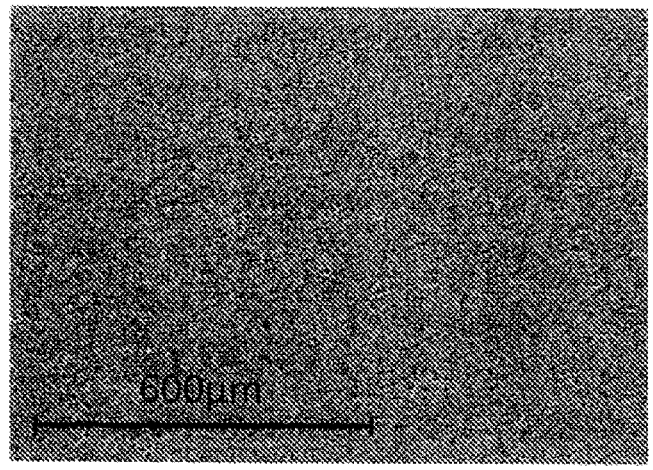
FIG. 3 is a picture of a thermal-sprayed ceramic film according to Example 1 observed under a scanning electron microscope (SEM).
Figure 4:
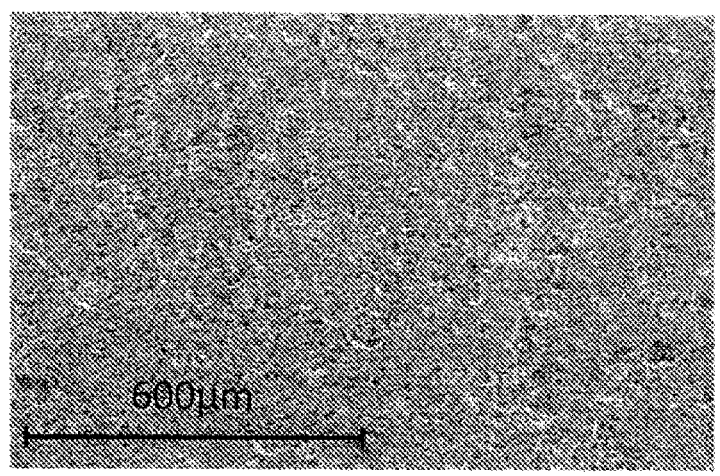
FIG. 4 is a picture of a thermal-sprayed ceramic film according to Comparative Example 1 observed under a scanning electron microscope (SEM).

Next, the breakdown voltages of the respective examples were measured. FIG. 2 shows the measurement results. The thermal-sprayed films formed on the inner and outer rings of Example 1 and Comparative Example 1 were observed under a scanning electron microscope (SEM), and they are shown in FIGS. 3 and 4, respectively. The breakdown voltage of each example was measured as follows: The outer ring formed with the thermal-sprayed film was fixed to a test jig, and, the voltage at which (insulation) breakdown occurs was measured, while increasing the applied voltage from the starting voltage of 2.0 kV at the increment of 0.2 kV.

Figure 5:
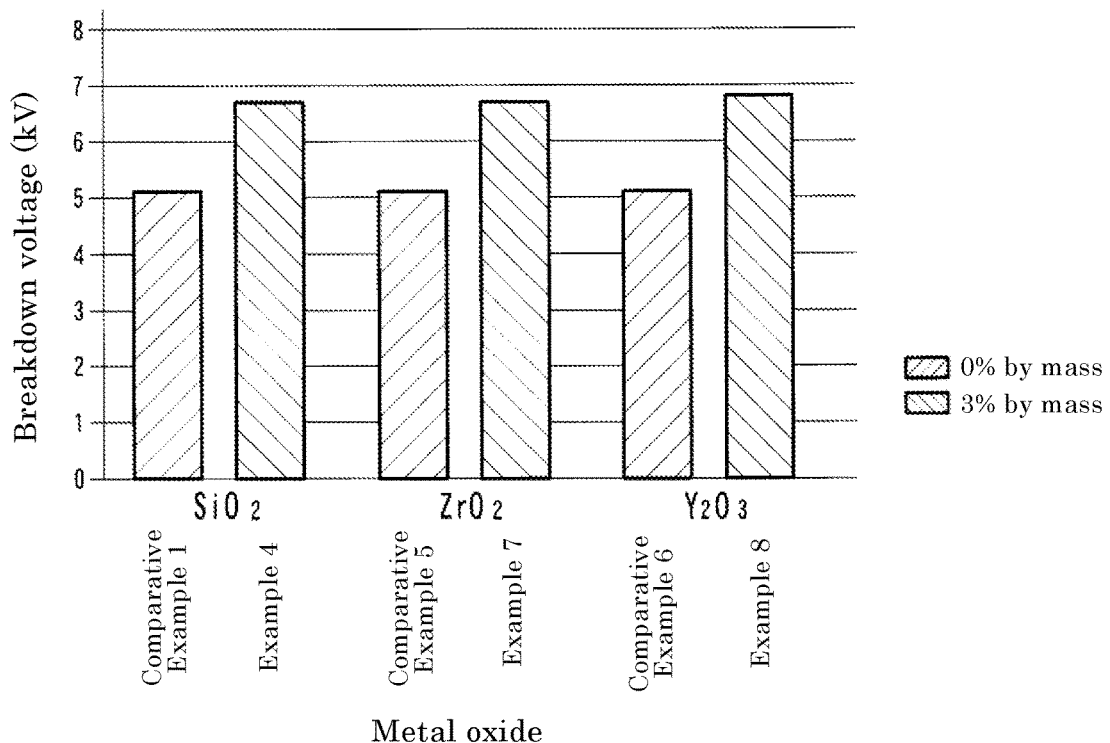
FIG. 5 is a graph showing breakdown voltages in Examples 4, 7 and 8, and Comparative Examples 1, 5 and 6.

The results of measurement of the breakdown voltages in Example 4 and Comparative Example 1 are shown in FIG. 5.

TABLE 1

|  | Example | | | | | | Comparative Example | | | |
|---|---|---|---|---|---|---|---|---|---|---|
|  | 1 | 2 | 3 | 4 | 5 | 6 | 1 | 2 | 3 | 4 |
| Added silica amount (mass %) | 1.5 | 1.7 | 2.0 | 3.0 | 4.0 | 5.0 | 0 | 1.0 | 6.0 | 7.0 |

|  | Reference Example | | | | | | | | |
|---|---|---|---|---|---|---|---|---|---|
|  | 1 | 2 | 3 | 4 | 5 | 6 | 7 | 8 | 9 |
| Added silica amount (mass %) | 0 | 1.0 | 1.5 | 2.0 | 3.0 | 4.0 | 5.0 | 6.0 | 7.0 |

Reference Examples 1 to 9

In each of Reference Examples 1 to 9, a rolling bearing was prepared, and thermal-spray films were formed on the inner and outer rings of the rolling bearing, respectively, in exactly the same manner as in Examples 1, 3 to 6 and Comparative Examples 1 to 4 except that, in the Reference Examples, instead of high-purity alumina powder ($Al_2O_3$, particle size: 8 to 38 μm), alumina powder having particle sizes of 98 μm or less (#320) was used, and the amounts of added silica were as shown in Table 1.

Then, the breakdown voltages of the thermal-sprayed films were measured. The relationship between the amounts of added silica and the breakdown voltages (kV) is shown by the dashed line in FIG. 2.

As is apparent from the relationship between the amounts of added silica and the breakdown voltages (kV) shown by the solid line in FIG. 2, when the amount of added silica ($SiO_2$) exceeded 1.0% by mass (Comparative Example 2), specifically, exceeded 1.5% by mass, the breakdown voltage (when also considering "variations" shown by the I-shaped vertical lines in FIG. 2) increased to a high level, i.e., exceeded 6 kV, and was maintained at the high level up to 5% by mass (Examples 1 to 6). However, when the amount of added silica exceeded 5% by mass, the breakdown voltage tended to fall below 6 kV.

This shows that, by limiting the amount of added silica as a metal oxide within the range of 1.5% or more by mass and 5% or less by mass, the desired effects of the present invention are obtained.

Also, as is apparent from the results shown by the dashed line in FIG. 2, if the average particle size of the alumina exceeds 60 μm as in the conventional Reference Examples, though the effect of added silica was obtained to some extent, the average value of the measured breakdown voltages decreased, and, even if the amount of added silica was adjusted, a breakdown voltage exceeding 5 kV was not achieved.

Also, as is apparent from the SEM pictures shown in FIGS. 3 and 4, the thermal-sprayed film of Comparative Example 1, which did not contain silica at all, had numerous pores open to the film surface (FIG. 4), whereas the thermal-sprayed film of Example 1, which contained the predetermined amount of silica, was dense with few openings on the film surface (FIG. 3).

Examples 7 to 10, Comparative Examples 5 to 7

In each of Example 7 and Comparative Example 5, a rolling bearing was prepared, and thermal-spray films were formed on the rolling bearing, in exactly the same manner as in Example 4 except that, in Example 7, 3% by mass of zirconia ($ZrO_2$) was added as a metal oxide instead of silica, and that, in Comparative Example 5, a metal oxide was not added at all. Then, the breakdown voltage was measured. The measurement results are shown in FIG. 5.

In each of Example 8 and Comparative Example 6, a rolling bearing was prepared, and thermal-spray films were formed on the rolling bearing, in exactly the same manner as in Example 4, except that, in Example 8, 3% by mass of yttria ($Y_2O_3$) was added as a metal oxide instead of silica, and that, in Comparative Example 6, a metal oxide was not added at all. Then, the breakdown voltage was measured. The measurement results are shown in FIG. 5.

As is apparent from the results shown in FIG. 5, by adding any of the above-described predetermined metal oxides, i.e., silica, zirconia and yttria by 3% by mass, high insulation properties were achieved, that is, the breakdown voltage exceeded 6 kV.

In the above Examples, in spite of the fact that the films contained a trace amount of titania due to the addition of gray alumina, a high level of breakdown voltage was maintained. This shows that the inclusion of a metal oxide other than the above predetermined metal oxides will not ruin the effects of the present invention.

The following Table 2 shows the kind, average particle size and amount of the metal oxide added to the thermal-spray material in each of Examples 1, 9 and 10 and Comparative Example 7.

TABLE 2

| | Example Number | | | |
|---|---|---|---|---|
| | Example | | | Comparative Example |
| Item | 1 | 9 | 10 | 7 |
| Kind of metal oxide | $SiO_2$ | $Y_2O_3$ | $ZrO_2$ | $SiO_2$ |
| Average particle size of metal oxide (μm) | 10 | 10 | 10 | 100 |
| Amount of added metal oxide (mass %) | 1.5 | 1.5 | 1.5 | 1.5 |

Evaluation on Relationship Between Thermal-Spray Distance and Breakdown Voltage

Evaluation 1

Rolling bearings were prepared of which the thermal-sprayed ceramic films were formed under the same conditions as in each of Example 1 and Comparative Examples 1 and 2, except that thermal spraying was performed at different thermal-spray distances of 140 mm, 150 mm and 160 mm, respectively, and the breakdown voltages of the films were measured. The measurement results are shown in FIG. 6.

Figure 6:
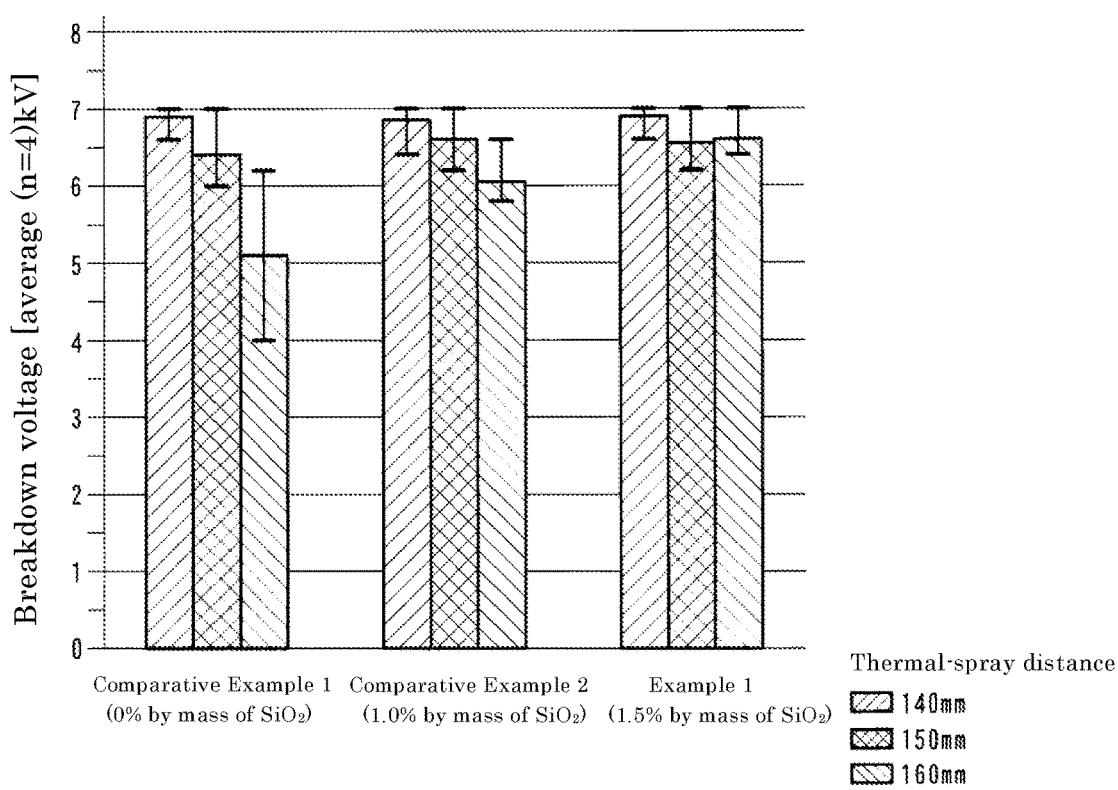
FIG. 6 is a graph showing breakdown voltages confirmed by changing a thermal-spray distance in Example 1, and Comparative Examples 1 and 2.

As is apparent from the results shown in FIG. 6, in Comparative Example 1, in which $SiO_2$ was not added, and Comparative Example 2, in which 1.0% by mass of $SiO_2$ is added, the breakdown voltage decreased with an increase in the thermal-spray distance, whereas, in Example 1, in which 1.5% by mass of $SiO_2$ was added, the breakdown voltage did not decrease with an increase in the thermal-spray distance, and was maintained at a high level, i.e., at a level higher than 6 kV.

This shows that, for the thermal-sprayed ceramic film formed of the thermal-spray material used in Example 1, even if the thermal-spray distance is changed to 140 mm or more, "variations" in breakdown voltage are small, and stable insulating properties are obtained.

Evaluation 2

Figure 7:
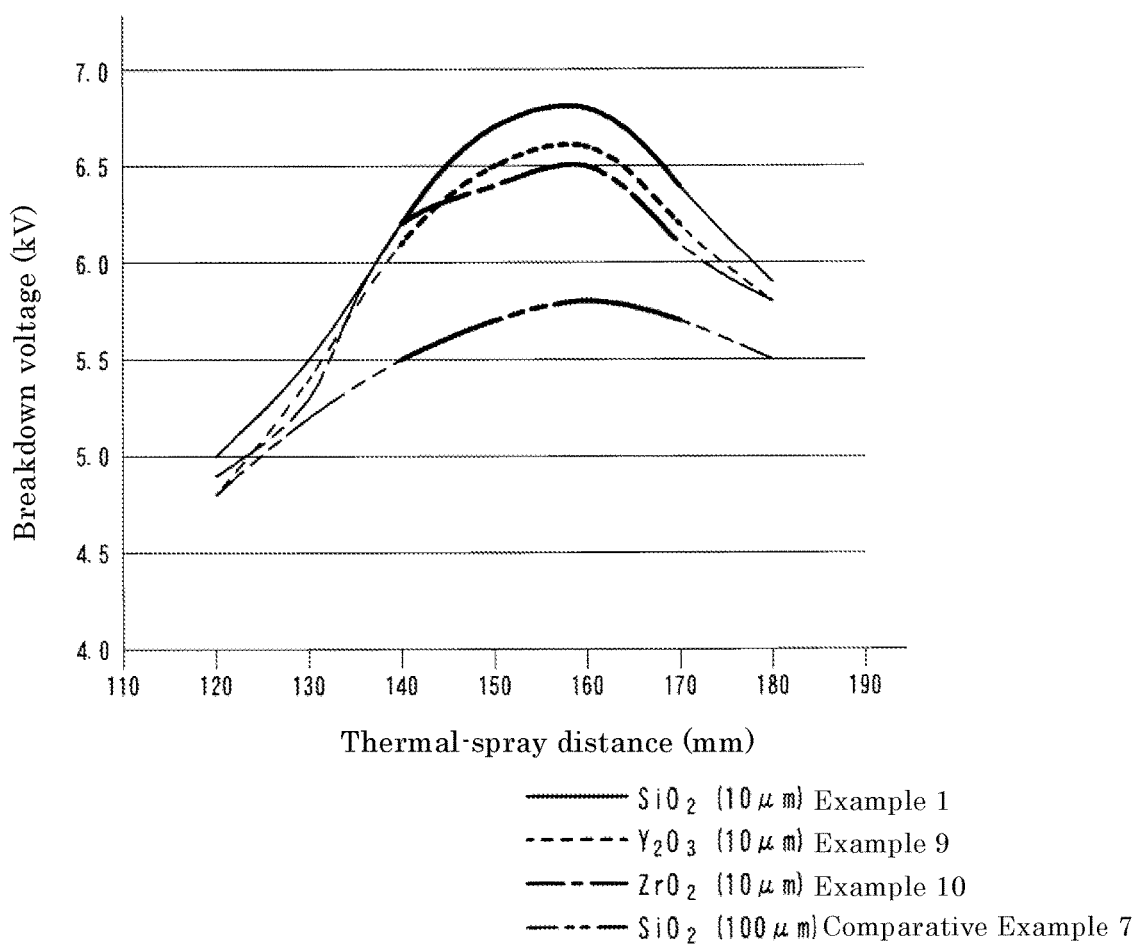
FIG. 7 is a graph showing the relationship between the thermal-spray distance and breakdown voltage in Example 1, 9, 10 and Comparative Example 7.

In the rolling bearing of each of Examples 1, 9 and 10 and Comparative Example 7, thermal-sprayed ceramic films were formed by thermal spraying under the same conditions as in Example 1 except that the thermal-spray material containing the predetermined metal oxide shown in Table 2 was thermal-sprayed while changing the thermal-spray distance within the range of 120 to 180 mm with an increment of 10 mm. Then, the breakdown voltages of the thermal-sprayed ceramic films on the bearing surfaces were measured. The measurement results are shown in FIG. 7. The breakdown voltages at the thermal-spray distance ranges of less than 140 mm and more than 170 mm are shown by thin portions of the respective lines in FIG. 7.

As is apparent from the results shown in FIG. 7, in each of Examples 1, 9 and 10, in which the predetermined amount (1.5% by mass) of metal oxide consisting of silica, yttria, or zirconia and having an average particle size of 10 μm was added, the breakdown voltages within the thermal-spray distance range of 140 to 170 mm were more than 6 kV, whereas, in Comparative Example 7, in which the silica had an average particle size of 100 μm, breakdown voltages were less than 6 kV.

Evaluation on Relationship Between Thermal-Spray Time and Film Formation Amount

For Example 1 and a conventional example (Reference Example 1), the relationship between the thermal-spray time including (if necessary) cooling time and the film formation amount was investigated when the thermal-spray distance was set at 160 mm in the thermal spraying step of Example 1, and set at 130 mm in the thermal spraying step of a conventional example (Reference Example 1). The results are shown in FIG. 8.

Figure 8:
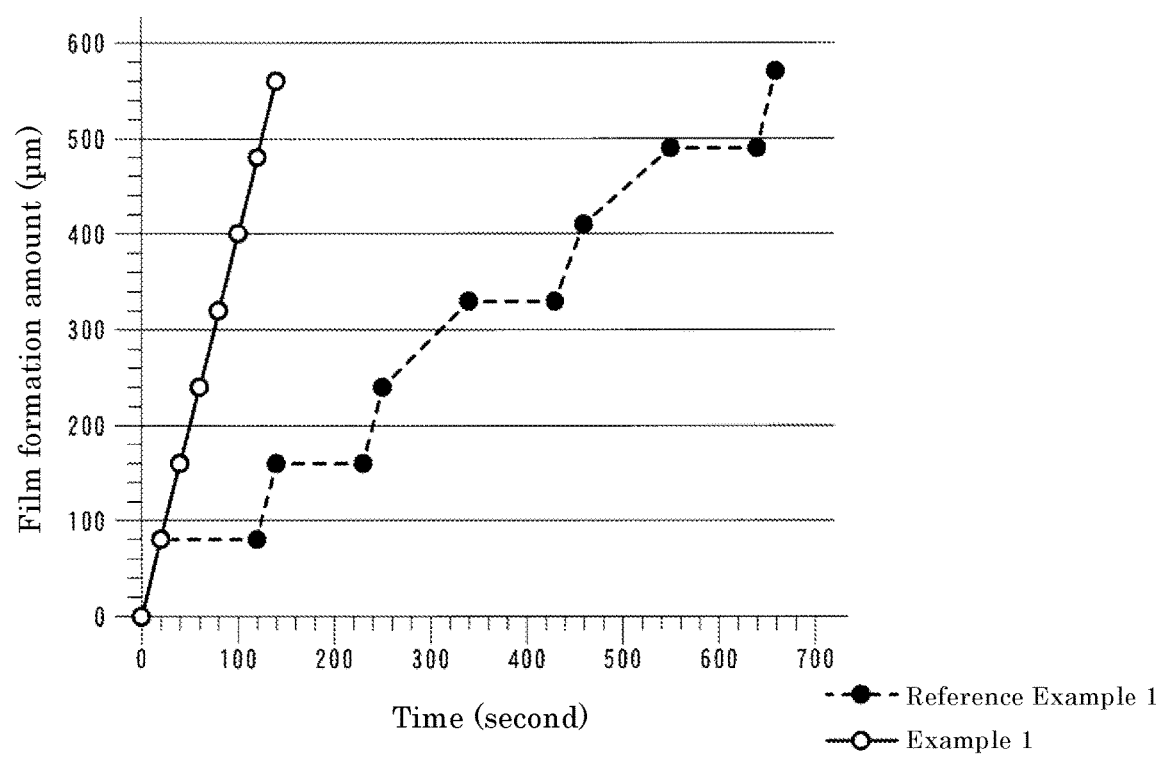
FIG. 8 is a graph showing the relationship between thermal-spray time and film formation amount in Reference Example 1 and Example 1.

As is apparent from the results of FIG. 8, in the conventional example (Reference Example 1), though the thermal-spray distance was decreased to 130 mm to form a dense thermal-sprayed film, four separate heat dissipating times were necessary to prevent the substrate from being tempered due to heating during thermal spraying. As a result, it took about 700 seconds to form a film of 570 μm.

On the other hand, in Example 1 in which the thermal-spray distance was set at an appropriate value (160 mm), the substrate was not heated to such an extent as to be tempered and thus not a lot of time was needed to cool the substrate. As a result, the film forming time decreased to about ⅕ of the time needed in the conventional film forming step.

INDUSTRIAL APPLICABILITY

The anti-electrolytic corrosion rolling bearing of the present invention can be versatilely used for supporting rotary shafts through which an electric current could flow, for example, used in air conditioners, trains, power generators such as wind power generators, electric motors for machine tools, and guides for linear motors.

DESCRIPTION OF REFERENCE NUMERALS

1: Inner ring
2: Outer ring
3: Rolling element
4: Thermal-sprayed film
5: Cage

The invention claimed is:
1. An anti-electrolytic corrosion rolling bearing comprising:
    an inner ring;
    an outer ring;
    a plurality of rolling elements rotatably disposed between a raceway surface of the inner ring and a raceway surface of the outer ring; and
    a thermal-sprayed ceramic film having electrical insulating properties, the ceramic film being disposed on one or each of an inner peripheral surface of the inner ring and an outer peripheral surface of the outer ring, wherein a thermal-spray material forming the thermal-sprayed ceramic film comprises, as a main component thereof, alumina particles having particle sizes of 5 μm to 60 μm and an average particle size of 30 μm to 60 μm and wherein the thermal-sprayed ceramic film is densified by filling pores between the alumina particles, with glassy melts of at least one metal oxide, the glassy melts having an average particle size of 5 μm to 40 μm.

2. The anti-electrolytic corrosion rolling bearing according to claim 1, wherein the thermal-sprayed ceramic film contains, based on 100% by mass of the thermal-sprayed ceramic film, 1.5% to 5.0% by mass of the glassy melts of the at least one metal oxide.

3. The anti-electrolytic corrosion rolling bearing according to claim 2, wherein the at least one metal oxide has a melting point lower than a melting point of alumina forming the alumina particles.

4. The anti-electrolytic corrosion rolling bearing according to claim 3, wherein the at least one metal oxide comprises one or more metal oxides selected from the group consisting of silica, yttria, titania and zirconia.

5. The anti-electrolytic corrosion rolling bearing according to claim 4, wherein the thermal-sprayed ceramic film is a film formable by thermal spraying at a thermal-spray distance of 140 mm to 170 mm, and densified such that a breakdown voltage thereof is 6 kV or more.

6. The anti-electrolytic corrosion rolling bearing according to claim 3, wherein the one or more metal oxides are silica, the silica being chemically combined with the alumina to densify the thermal-sprayed ceramic film.

7. The anti-electrolytic corrosion rolling bearing according to claim 6, wherein the thermal-sprayed ceramic film is a film formable by thermal spraying at a thermal-spray distance of 140 mm to 170 mm, and densified such that a breakdown voltage thereof is 6 kV or more.

8. The anti-electrolytic corrosion rolling bearing according to claim 3, wherein the thermal-sprayed ceramic film is a film formable by thermal spraying at a thermal-spray distance of 140 mm to 170 mm, and densified such that a breakdown voltage thereof is 6 kV or more.

9. The anti-electrolytic corrosion rolling bearing according to claim 2, wherein the thermal-sprayed ceramic film is a film formable by thermal spraying at a thermal-spray distance of 140 mm to 170 mm, and densified such that a breakdown voltage thereof is 6 kV or more.

10. The anti-electrolytic corrosion rolling bearing according to claim 1, wherein the at least one metal oxide has a melting point lower than a melting point of alumina forming the alumina particles.

11. The anti-electrolytic corrosion rolling bearing according to claim 10, wherein the at least one metal oxide comprises one or more metal oxides selected from the group consisting of silica, yttria, titania and zirconia.

12. The anti-electrolytic corrosion rolling bearing according to claim 11, wherein the one or more metal oxides are silica, the silica being chemically combined with the alumina to densify the thermal-sprayed ceramic film.

13. The anti-electrolytic corrosion rolling bearing according to claim 12, wherein the thermal-sprayed ceramic film is a film formable by thermal spraying at a thermal-spray distance of 140 mm to 170 mm, and densified such that a breakdown voltage thereof is 6 kV or more.

14. The anti-electrolytic corrosion rolling bearing according to claim 11, wherein the thermal-sprayed ceramic film is a film formable by thermal spraying at a thermal-spray distance of 140 mm to 170 mm, and densified such that a breakdown voltage thereof is 6 kV or more.

15. The anti-electrolytic corrosion rolling bearing according to claim 10, wherein the thermal-sprayed ceramic film is a film formable by thermal spraying at a thermal-spray distance of 140 mm to 170 mm, and densified such that a breakdown voltage thereof is 6 kV or more.

16. The anti-electrolytic corrosion rolling bearing according to claim 1, wherein the thermal-sprayed ceramic film is a film formable by thermal spraying at a thermal-spray distance of 140 mm to 170 mm, and densified such that a breakdown voltage thereof is 6 kV or more.

* * * * *